United States Patent [19]

Sun

[11] Patent Number: 5,177,947
[45] Date of Patent: Jan. 12, 1993

[54] RAKE

[76] Inventor: Han-Ching Sun, No. 43, Ta-An Rd., Tien-Chung Chen, Changhwa Hsien, Taiwan

[21] Appl. No.: 745,742

[22] Filed: Aug. 16, 1991

[51] Int. Cl.$^5$ .............................................. A01D 7/06
[52] U.S. Cl. ............................... 56/400.17; 56/400.21
[58] Field of Search ........... 56/400.04, 400.05, 400.06, 56/400.07, 400.16, 400.17, 400.19, 400.2, 400.21

[56] References Cited

U.S. PATENT DOCUMENTS

| 2,794,312 | 6/1957 | Finkes | 56/400.17 |
| 4,173,835 | 11/1979 | Burrell | 56/400.17 X |
| 4,215,528 | 8/1980 | Fodor | 56/400.17 |

Primary Examiner—Terry Lee Melius
Attorney, Agent, or Firm—Ladas & Parry

[57] ABSTRACT

A rake has a handle shaft, and a fork portion including a flat head and a plurality of prongs. The flat head has a plurality of spaced longitudinally extending grooves and groove-confining ridges, and a plate member transversely extending over the groove-confining ridges. The plate member has a plurality of holes each of which is aligned to one of the grooves. A metal plate is attached to the plate member between the plate member and the groove-confining ridges. Each of the prongs has a first curved end, and a second end received in one of the grooves. The metal plate has a plurality of projections each of which is aligned with one of the holes and embeds into one of the prongs to prevent the prong from being released from the groove.

2 Claims, 3 Drawing Sheets

RAKE

BACKGROUND OF THE INVENTION

1. Field of the Invention

This invention relates to a rake, more particularly to a rake having an improved construction.

2. Description of the Related Art

A rake is generally used for drawing together straw, dead leaves, etc. A conventional rake includes a fork portion with a plurality of prongs which are manually bound together by a skilled laborer. Such a conventional rake can not be mass-produced.

SUMMARY OF THE INVENTION

Therefore, the objective of this invention is to provide an improved rake which can be mass-produced with reduced labor and without the need for experienced and skilled workers.

Accordingly, a rake of this invention includes a handle shaft, and a fork portion having a flat head and a plurality of prongs. The flat head has a first end portion connected to the handle shaft, an opposite second end portion, two opposite side portions respectively interconnecting the first and second end portions. The flat head has a plurality of spaced grooves and groove-confining ridges longitudinally extending from the second end portion toward the first end portion, and a plate member transversely extending over the groove-confining ridges between the two side portions. The plate member has a plurality of holes each of which is aligned to one of the grooves. A metal plate is attached to the plate member between the plate member and the groove-confining ridges. Each of the prongs has a first curved end, and a second end received in one of the grooves. The metal plate has a plurality of projections each of which is aligned with one of the holes and embeds into one of the prongs to prevent said one prong from being released from the groove.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
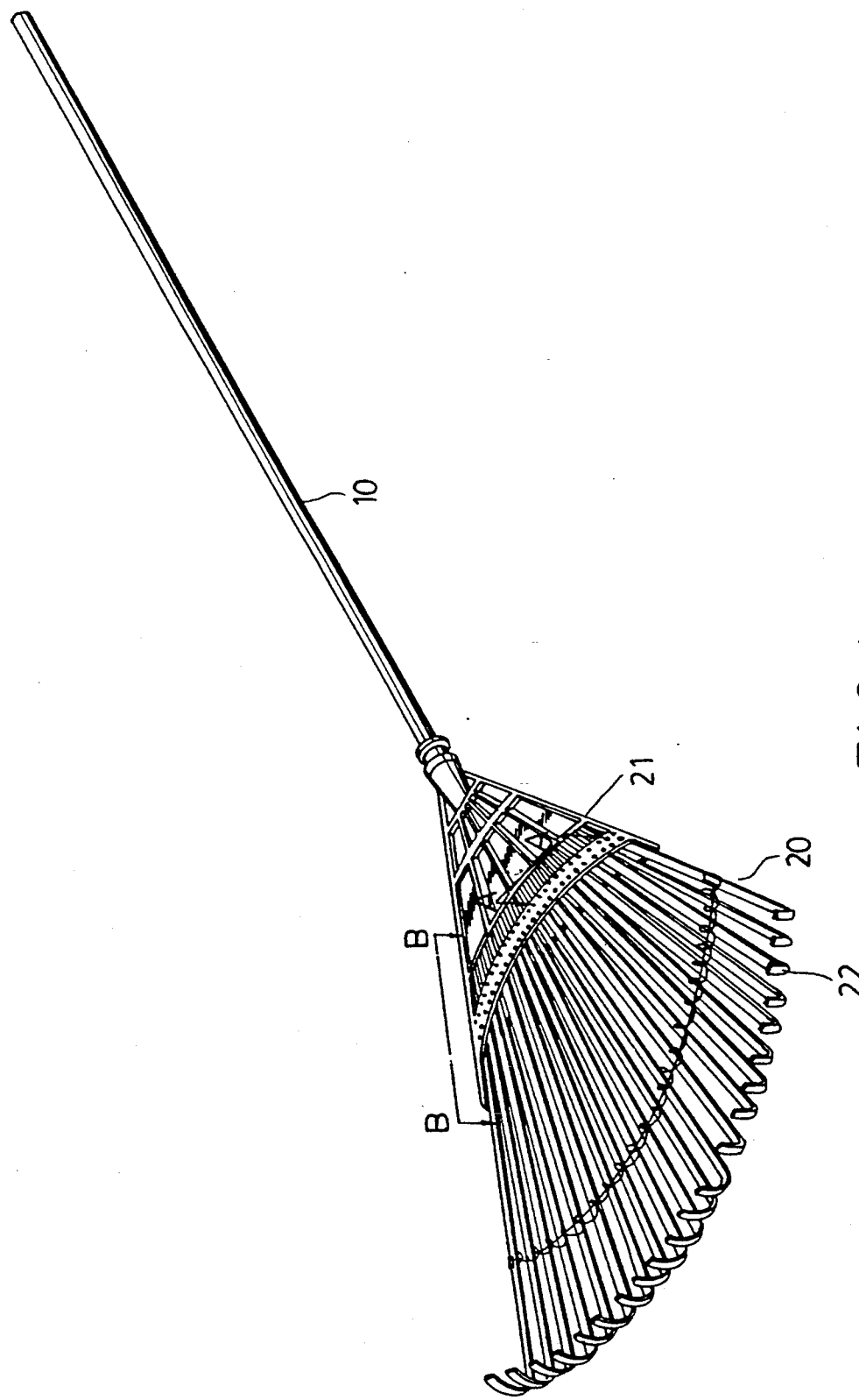
FIG. 1 is a perspective view of a rake of this invention.
Figure 2:
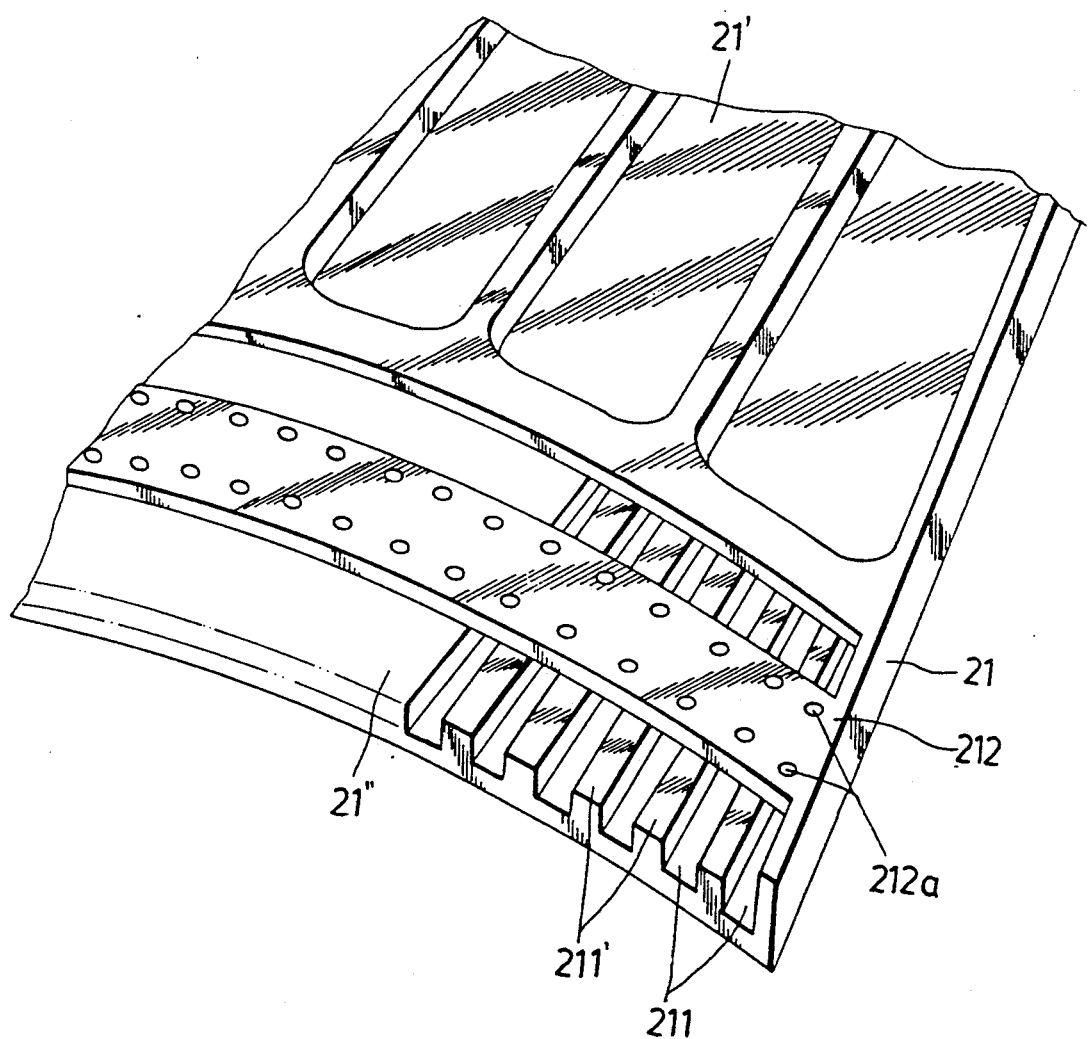
FIG. 2 is a partial schematic view of a flat head of the rake of this invention.
Figure 3:
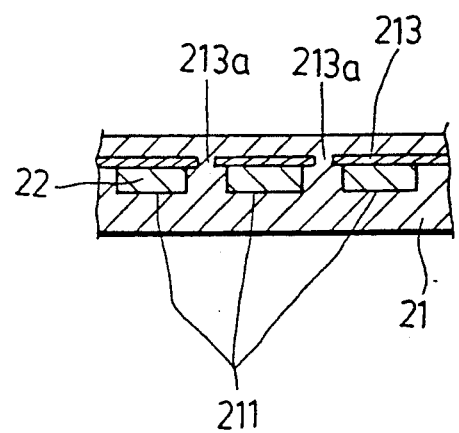
FIG. 3 is a sectional view taken along line A—A in FIG. 1.
Figure 4:
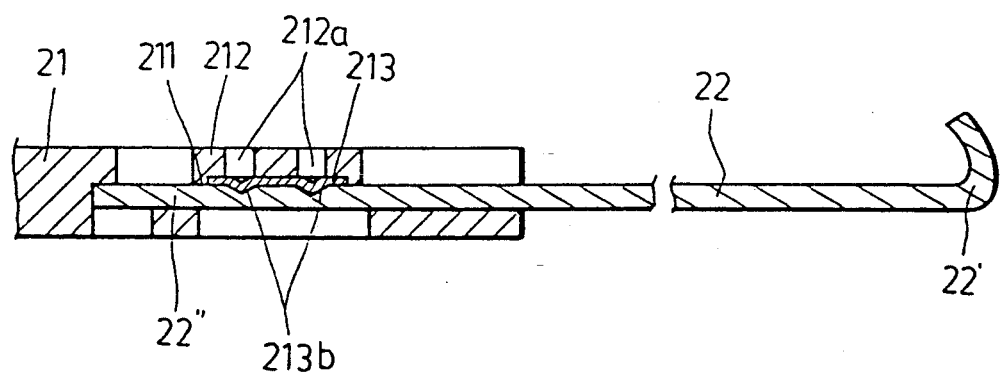
FIG. 4 is a sectional view taken along line B—B in FIG. 1.

Referring to FIGS. 1 and 2, a rake of this invention includes a handle shaft (10), and a fork portion (20) having a flat head (21) and a plurality of prongs (22). The flat head (21) has a first end portion (21') connected to the handle shaft (10), an opposite second end portion (21"), and two opposite side portions respectively interconnecting the first and second end portions (21', 21"). The flat head (21) includes a plurality of spaced grooves (211) and groove-confining ridges (211') longitudinally extending from the second end portion (21") toward the first end portion (21'), and a plate member (212) transversely extending over the groove-confining ridges (211') between the two side portions. The plate member (212) has a pair of holes (212a) aligned with each of the grooves (211). Referring to FIGS. 3 and 4, a metal plate (213) is attached to the plate member (212) between the plate member (212) and the groove-confining ridges (211'). The metal plate (213) has a plurality of longitudinally extending slots (213a) respectively aligned with the ridges (211'). With the metal plate (212) in place, the slots (213a) permit plastic to flow therethrough during injecting molding of the flat head (21), thereby integrally connecting the plate member (212) to the ridges (211') and firmly positioning the metal plate (213) in the flat head (21). Each of the prongs (22) has a first curved end (22') and a second end (22") received in one of the grooves (211).

The flat head (21) is a one-piece injection molded plastic article. The metal plate (213) is placed in a mold when the flat head (21) is formed, and the slots (213a) fill with the plastic material. Therefore, the plate member (212) is firmly connected to the ridges (211') and the metal plate (213) is firmly positioned in the flat head (21). The prongs (22) are firmly attached to the flat head (21) by placing their second ends (22") into the grooves (211) and punching the metal plate (213) using a press machine having punching rods which punch the metal plate (213) through the holes (212a) to form projections (213b) which embed into the prongs (22) to prevent the prongs (22) from being detached from the grooves (211).

Therefore, the rake of this invention is fabricated with less work than the conventional rake and without the need for experienced and skilled workers. In other words, this rake can be mass-produced.

While the present invention has been described in connection with what is considered the most practical and preferred embodiment, it is understood that this invention is not limited to the disclosed embodiment, but is intended to cover various arrangements included within the spirit and scope of the broadest interpretations and equivalent arrangements.

I claim

1. A rake comprising:

a handle shaft; and a fork portion having a flat head, said flat head including a first end portion connected to said handle shaft, an opposite second end portion, two opposite side portions respectively interconnecting said first and second end portions, a plurality of spaced groves and groove-confining ridges longitudinally extending from said second end portion toward said first end portion, and a plate member transversely extending over said groove-confining ridges between said two side portions, said plate member having a plurality of holes each of which is aligned to one of said grooves, a metal plate attached to said plate member between said plate member and said groove-confining ridges; and wherein said fork portion further has a plurality of prongs each of which has a first curved end and a second end lying in one of said grooves, said metal plate having a plurality of projections each of which is aligned with one of said holes in said plate member and is embedded into one of said prongs to prevent said one of said prongs from being released from said groove.

2. A rake as claimed in claim 1, wherein said flat head is a one-piece injection molded plastic article, said metal plate having a plurality of longitudinally extending slots respectively aligned with said ridges, said slots being filled with plastic material during injection molding of said flat head, thereby integrally connecting said plate member to said ridges and firmly position said metal plate in said flat head.

* * * * *